United States Patent
Seay et al.

(10) Patent No.: US 8,271,386 B2
(45) Date of Patent: Sep. 18, 2012

(54) PAYMENT BALANCE EXCEPTION PROCESSING

(75) Inventors: Daniel S. Seay, Charlotte, NC (US);
Robert C. Wider, Charlotte, NC (US);
Rajesh Khosla, Jacksonville, FL (US);
Jared J. Rorrer, Charlotte, NC (US);
Manoj Kapil, St. Augustine, FL (US);
Nathan L. Bernbaum, Dallas, TX (US);
Leslie D. Standlee, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 130 days.

(21) Appl. No.: 12/906,105

(22) Filed: Oct. 17, 2010

(65) Prior Publication Data
US 2012/0095913 A1    Apr. 19, 2012

(51) Int. Cl.
G06Q 40/00    (2012.01)

(52) U.S. Cl. ............... 705/44; 705/35; 705/40; 705/41; 705/42; 705/43; 705/45

(58) Field of Classification Search ............ 705/35, 705/40–45
See application file for complete search history.

(56) References Cited

U.S. PATENT DOCUMENTS

| | | | | |
|---|---|---|---|---|
| 7,387,238 B2* | 6/2008 | Foss et al. | | 235/380 |
| 7,617,156 B1* | 11/2009 | Wolfson | | 705/42 |
| 7,664,705 B2* | 2/2010 | Walker et al. | | 705/45 |
| 8,074,876 B2* | 12/2011 | Foss et al. | | 235/380 |
| 2003/0236728 A1* | 12/2003 | Sunderji et al. | | 705/35 |
| 2007/0106558 A1* | 5/2007 | Mitchell et al. | | 705/16 |
| 2007/0125840 A1* | 6/2007 | Law et al. | | 235/379 |
| 2008/0015985 A1* | 1/2008 | Abhari et al. | | 705/42 |
| 2009/0037310 A1* | 2/2009 | Claypoole et al. | | 705/35 |
| 2010/0063903 A1* | 3/2010 | Whipple et al. | | 705/30 |
| 2010/0138288 A1* | 6/2010 | Walker et al. | | 705/14.25 |
| 2010/0145857 A1* | 6/2010 | Davila et al. | | 705/44 |
| 2011/0077073 A1* | 3/2011 | Gagner et al. | | 463/25 |
| 2011/0125643 A1* | 5/2011 | Cameo et al. | | 705/44 |
| 2011/0191149 A1* | 8/2011 | Blackhurst et al. | | 705/14.1 |
| 2012/0054093 A1* | 3/2012 | Schamer et al. | | 705/39 |

* cited by examiner

Primary Examiner — Narayanswamy Subramanian
(74) Attorney, Agent, or Firm — Banner & Witcoff, Ltd.; Michael A. Springs

(57) ABSTRACT

A system for managing and processing exceptions to shared global treasury limits across multiple different platforms can be utilized by an organization to eliminate inconsistent client experiences and increase overall operating efficiency. A management and processing system can decision transactions of clients (e.g., customers, users, members, account-holders, clients, and the like) through a combination of straight-through and manual processes that are utilized according to select qualifying criteria. The system provides for auto-decisioning of low-risk, low-amount transactions while enabling authorized users to manually decision and otherwise manage transactions through various workflow-driven graphical user interfaces (GUIs). The GUIs can be configured to allow transaction approvers to standardize workflow for manual processing and approval of transactions that cannot be entirely decisioned by, or are exempt from, automated straight-through processing and can further be configured to provide users with numerous viewing, reporting, routing, tracking and decision override capabilities.

14 Claims, 11 Drawing Sheets

| Holds | | | | | | | | □ ☒ |
|---|---|---|---|---|---|---|---|---|
| Primary GCI | 1000 | ▼ — 705 | Account # | ###### | ▼ — 710 | | Platform | IDS |

Account Level

| | Hold Type | Hold Expiry Date | Daily Recurring Hold | Hold Expiry From Time | Hold Expiry To Time |
|---|---|---|---|---|---|
| ● | Credit Hold | | □ | | |
| ● | Debit Hold | | □ | | |
| | Post No Debit | 08/26/2010 | □ | | |
| | Post No Credit | 08/25/2010 | □ | | |
| | Timelien | 08/26/2010 | ☑ | 12:00 AM | 1:00 AM |
| | Indefinite | 08/31/2010 | □ | | |

| | Hold Type | | Hold Expiry Date | Hold Expiry From Time | Hold Expiry To Time |
|---|---|---|---|---|---|

* Account level holds will supercede transaction level holds. Transaction level holds will take effect when the account level hold has expired, been deleted, or overridden.
** Time lien Holds Only; To set a hold to be in effect at the beginning of day, leave "From" time blank. The "To" time can not be left blank and must have time entered.

☐ Show All Held Transactions

Transaction Level

| | Transaction # | Dollar Amount | Advise Type | SOR Exception Code Type | Hold / Override Type | Hold Expiry From Time | Hold Expiry To Time |
|---|---|---|---|---|---|---|---|
| ☐ | 27 | ###### | 1 | | Credit | RG - Credit Hold ▼ | |
| ☐ | 28 | ###### | 1 | | Debit | RG - Debit Hold ▼ | |
| ☐ | 29 | ###### | 1 | | Debit | RG - Debit Hold | |
| | | | | | | A - Post No Debit | |
| | | | | | | A - Timelien | |
| | | | | | | A - Indefinite | |

Transaction Level Hold / Override Type: [ ▼ ]  Time Lien Hold Expiry Time: From: [ ▼ ]  To: [ ▼ ]

[ OK ]  [ Cancel ]  [ Clear ]  [ Add ]  [ Delete ]

* Transaction Level Holds: Only wire transactions will be active to set holds. Only one hold type is allowed per transaction.

FIG. 7

| QUEUE | | Ultimate Parent GC# | GCI Name | Earliest Deadline | Number of Exception Accounts | Risk Rating | | Tax ID | | |
|---|---|---|---|---|---|---|---|---|---|---|
| 800 | | Primary GC# | GCI Name | Earliest Deadline | Status | Risk Rating | LOB | LOB | | Reason Code |
| | | Account # | Account Name | Platform | Earliest Deadline | Number of TXNs | TXNs Amount | Status | Assigned To | |
| ⊟ | ○ | 1111111111 | XYZ Corp | | | | | Bus. Bank | | |
| | ○ | 1111111111 | XYZ Corp | | 13 | 1 | | Bus. Bank | 1234 | |
| ⊟ | □ | 000001 | XYZ Corp A1 | | | 2 | ##### | UnDecisioned | xxxxx | 3 |
| | ○ | 444444444 | XYZ East | | | 1 | ##### | Bus. Bank | 1 | |
| | □ | 000006 | XYZ East A1 | | | 3 | ##### | UnDecisioned | xxxxx | 2 |
| | □ | 000007 | XYZ East A2 | | | 3 | ##### | Decisioned | xxxxx | 13 |
| | □ | 000008 | XYZ East A3 | | | 3 | ##### | Decisioned | xxxxx | 15 |
| ⊟ | ○ | 666666666 | XYZ West | | | 3 | | Bus. Bank | 1 | |
| | □ | 000009 | XYZ West A1 | | | 3 | ##### | UnDecisioned | xxxxx | 1 |
| | □ | 000010 | XYZ West A2 | | | 3 | ##### | UnDecisioned | xxxxx | 1 |
| | □ | 000011 | XYZ West A3 | | | 3 | ##### | UnDecisioned | xxxxx | 1 |
| ⊟ | ○ | 777777777 | XYZ Corp 1 | | | 3 | | Bus. Bank | 1 | |
| | □ | 000014 | XYZ Corp 2 | | | 3 | ##### | UnDecisioned | xxxxx | 1 |
| | □ | 000013 | XYZ Corp 3 | | | 3 | ##### | UnDecisioned | xxxxx | 1 |
| | □ | 000012 | XYZ Corp 4 | | | 3 | ##### | UnDecisioned | xxxxx | 1 |
| ⊟ | ○ | 888888888 | XYZ Corp 5 | | 1/1/1900 11:00:00 AM | 2 | | Bus. Bank | 1 | |
| | □ | 000016 | XYZ Corp 6 | | | 2 | ##### | UnDecisioned | xxxxx | 1 |
| | □ | 000017 | XYZ Corp 7 | | | 2 | ##### | UnDecisioned | xxxxx | 1 |

FIG. 11

PAYMENT BALANCE EXCEPTION PROCESSING

FIELD

Aspects of the disclosure relate to managing risk. More specifically, aspects of the disclosure relate to managing global risk exposure of a financial institution by systematically processing payment exceptions to recorded and monitored treasury limits.

BACKGROUND

Many financial institutions offer treasury services to multinational clients that operate throughout various regions of the world. Because such global clients often establish their headquarters in one country while maintaining branches and/or subsidiaries in one or more other countries, financial organizations typically manage the products and services they provide to these clients through separate regional and/or country-specific platforms and processes. In the context of treasury services, financial institutions manage their risk exposure by establishing transaction, daylight, and overnight limits that are used for monitoring and decisioning payment releases for transactions involving accounts exceeding a line of credit. However, managing and processing payments decisioning for shared treasury limits of global clients requires extensive coordination between different branches or regional offices of a financial institution and a significant investment of time and resources. Furthermore, the manual nature of applying treasury limits when decisioning payments across multiple platforms offers very little flexibility to accommodate clients' global needs.

BRIEF SUMMARY

The following presents a simplified summary of the disclosure in order to provide a basic understanding of some aspects herein that allow for managing global treasury risk exposure from a centralized treasury monitoring system. It is not intended to identify key or critical elements of the disclosure or to delineate the scope of the disclosure. The following summary merely presents some concepts of the disclosure in a simplified form as a prelude to the more detailed description provided below.

One or more aspects described herein relates to systematically processing and decisioning release of payment exceptions to established treasury limits to eliminate inconsistent client experiences and increase overall efficiency in handling overdraft transactions exceeding a line of credit. In at least one arrangement, a system and method of straight-through processing of low-risk transactions are provided to overcome the numerous inconsistencies that arise when such transactions are manually processed. By increasing efficiency associated with straight-through processing and approval of low-dollar, low-risk transactions, an organization (e.g., a financial institution) may improve its ability to mitigate global treasury risk exposure while also reducing operating expenses related to processing such transactions through other channels.

One or more other aspects described herein relate to providing enhanced tools and processes for manually decisioning and otherwise managing transactions exceeding a line of credit. In one arrangement, graphical user interfaces (GUIs) allow transaction approvers (e.g., associates, employees, approvers, users, officials, and the like) of the organization to standardize workflow for manual processing and approval of transactions that cannot be entirely decisioned through automated straight-through processing. The GUIs may also provide users with reporting and decision override capabilities. The GUIs may be a component of a limit module that presents various client views of account information and enables users to manage and prioritize exceptions. Among other advantages, the limit module reduces the number of source systems and individual hand-offs required to research and decision payment exceptions, thereby creating additional cost-savings.

In one or more arrangements, the GUIs are workflow driven with consistently applied manual decisioning criteria to allow for processing of transactions exceeding a line of credit across all deposit platforms. The GUIs provide users with the ability to manage transaction queues, prioritize and distribute work items, and track status and decisions of transaction being processed. Additionally, various aspects described herein relate to the GUIs being configured to facilitate routing of transactions to appropriate associates for decisioning and identify appropriate risk approvers and client teams as necessary.

One or more other aspects described herein relates to automatically applying a risk policy to a transaction exceeding a line of credit based on an amount of the transaction (e.g., in U.S. Dollars) and a risk rating for daylight and ledger transactions to increase straight-through processing efficiency of the organization. In one arrangement, the management and processing system automatically and consistently applies limits according to procedures that may be customized based on standardized client and/or business need, regardless of the platform involved. The treasury limits may be applied at any level within the client relationship (e.g., family, primary, account, transaction, and the like).

Aspects of the disclosure may be provided in a computer-readable medium having computer-executable instructions to perform one or more of the process steps described herein.

These and other aspects of the disclosure are discussed in greater detail throughout this disclosure, including the accompanying drawings.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIG. 5 illustrates an example user interface for viewing detailed account information about accounts requiring exception decisioning according to one or more aspects described herein;

FIG. 6 illustrates an example user interface for searching exception transactions based on various criteria according to one or more aspects described herein;

FIG. 7 illustrates an example user interface through which holds may be placed on client accounts to force manual processing and decisioning of exceptions to treasury limits according to one or more aspects described herein;

FIG. 8 illustrates an example user interface for viewing summary information about related accounts requiring exception decisioning according to one or more aspects described herein;

FIG. 9 illustrates an example user interface for viewing information about all exceptions to treasury limits and account balances associated with a particular client according to one or more aspects described herein;

FIG. 11 illustrates an example user interface for configuring straight-through processing of exceptions to treasury limits at a client-specific level for a management and processing system according to one or more aspects described herein;

DETAILED DESCRIPTION

Figure 1:
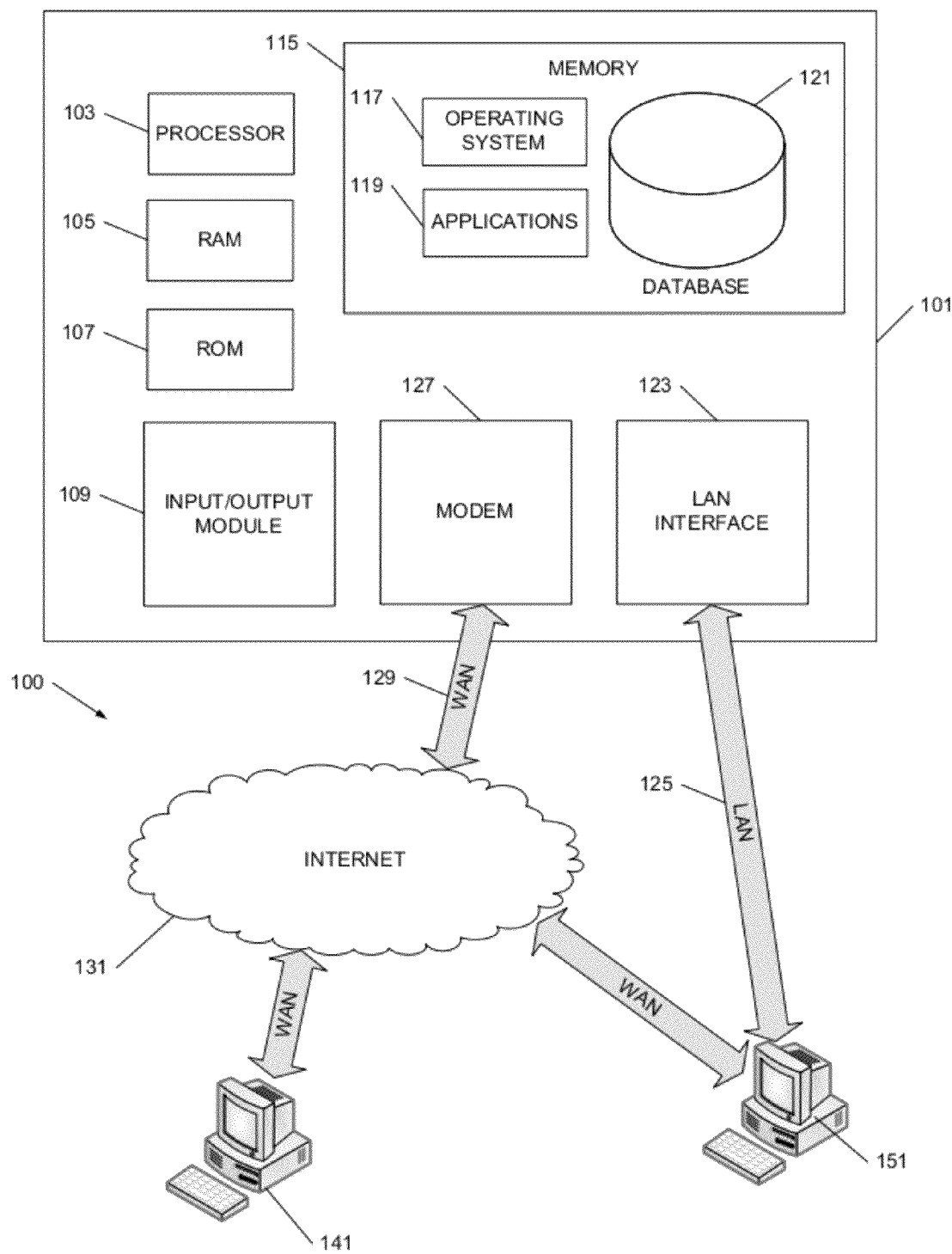
FIG. 1 illustrates a schematic diagram of a general-purpose digital computing environment in which certain aspects of the present disclosure may be implemented.

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing an organization (e.g., a financial institution) with a system and method for managing and processing exceptions to shared global treasury limits across multiple different platforms utilized by the organization. In at least one arrangement, a management and processing system decisions transactions of clients (e.g., customers, users, members, account-holders, clients, and the like) through a combination of straight-through and manual processes in a manner that eliminates inconsistent client experiences and decreases overall risk exposure to the organization. In at least some arrangements, the system described herein manages exceptions to clients' booked and recorded treasury limits such that a higher volume of straight-through processing of such exceptions allows for greater operating efficiency of the organization. For example, providing an organization with the ability to process a greater number of exceptions to treasury limits in an automated manner allows the organization to utilize its resources in more efficient ways, such as developing more strategic engineering of treasury limits, rather than focusing such resources on less-productive matters such as recording limits, reporting exceptions, and the like.

Other aspects described herein provide for auto-decisioning of low-risk, low-amount transactions that meet certain qualifying criteria while also enabling authorized users to manually decision and otherwise manage transactions exceeding a line of credit through various workflow-driven graphical user interfaces (GUIs) created and maintained by the system. The GUIs allow transaction approvers (e.g., associates, employees, approvers, users, officials, and the like) of the organization to standardize workflow for manual processing and approval of transactions that cannot be entirely decisioned by, or are exempt from, automated straight-through processing. The GUIs also provide users with reporting and decision override capabilities, allow users to manage transaction queues, prioritize and distribute work items, and track status and decisions of transaction being processed. Additionally, various aspects described herein relate to the GUIs being configured to facilitate routing of transactions to appropriate associates for decisioning and identify appropriate risk approvers and client teams as necessary. Standardizing workflow of manual processing by utilizing user-friendly GUIs that include numerous capabilities as will be described herein, ensures consistent application of an organization's risk policy and client-specific treasury limits across multiple different platforms.

In one or more arrangements, the automated decisioning may be based on global relationship account balances relevant to a given transaction exceeding a line of credit. As described in greater detail herein, the auto-decisioning may be configurable such that certain transactions are excluded from being auto-decisioned based on select criteria (e.g., client, account type, risk rating, country, and the like). As used herein, client and/or account "relationships" may be defined at multiple levels, including family, primary, and the like. For example, a "family" relationship between clients and/or accounts may include a parent company or corporation that has one or more subsidiary companies that may or may not also be parent companies themselves (e.g., in the arrangement where subsidiaries are organized in a hierarchal manner amongst one another). Any such subsidiary company may be considered a "primary" client and/or account when referring to an transaction to which the company is directly tied or related.

As will be described in greater detail below, the management and processing system of the present disclosure may auto-decision and auto-pay exceptions to established treasury limits consistently across all deposit platforms of the organization based on one or more criteria. In at least one arrangement, transactions having certain attributes may be subject to automated processing (e.g., straight-through processing) that outputs a decision based on risk rating and risk policy thresholds configurable by the organization and applied consistently across all relevant platforms. In at least one arrangement, "risk rating" refers to a calculated estimate for a given transaction (e.g., releasing requested funds on behalf of a client account with inadequate funds to fulfill the request) of the amount of loss (expected loss) that may be acceptably taken on the transaction. For example, the risk rating calculation may begin with a recorded risk rating for a particular client or account which is then adjusted for meaningful support (e.g., guarantor and/or collateral).

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the organization residing at different physical locations.

Server 101 may operate in a networked environment 100 supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. Furthermore, any of a number of different communication protocols, such as TCP/IP, Ethernet, FTP, HTTP and the like, may be used within networked environment 100.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like., that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
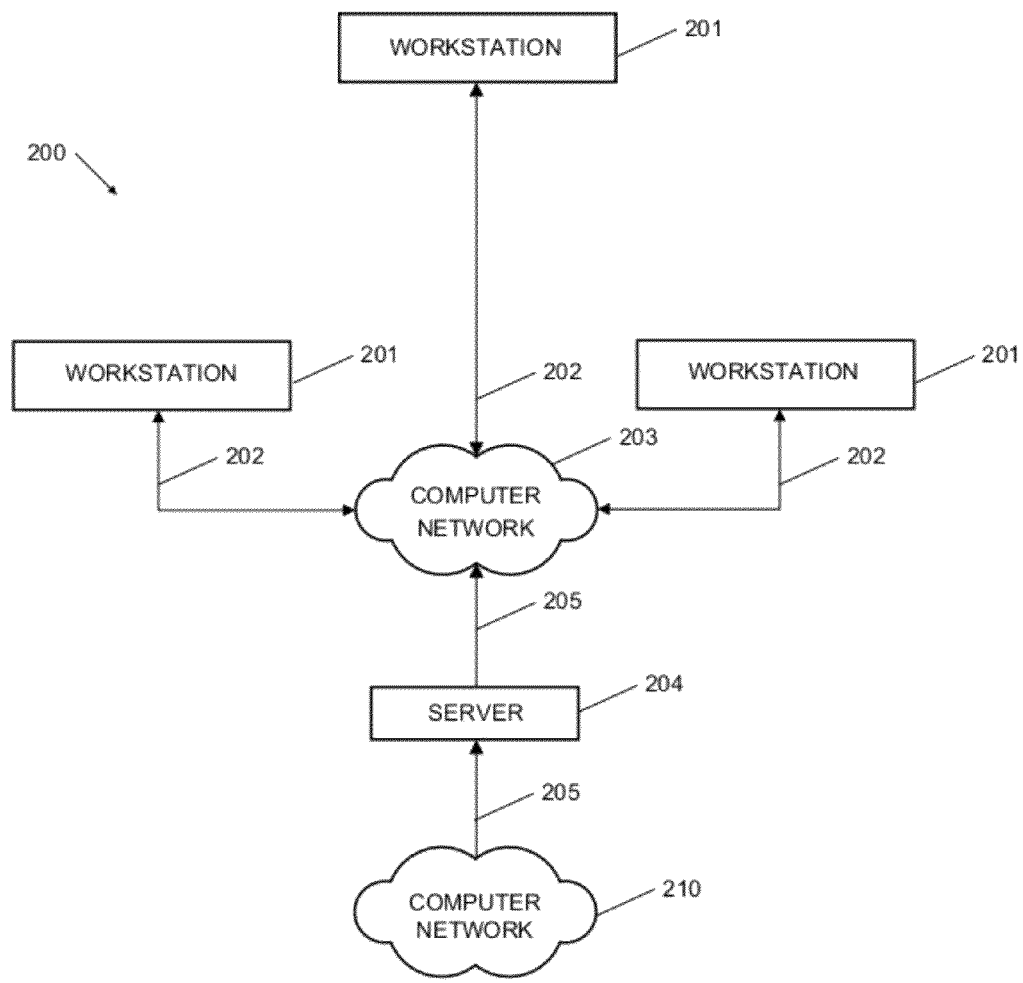
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
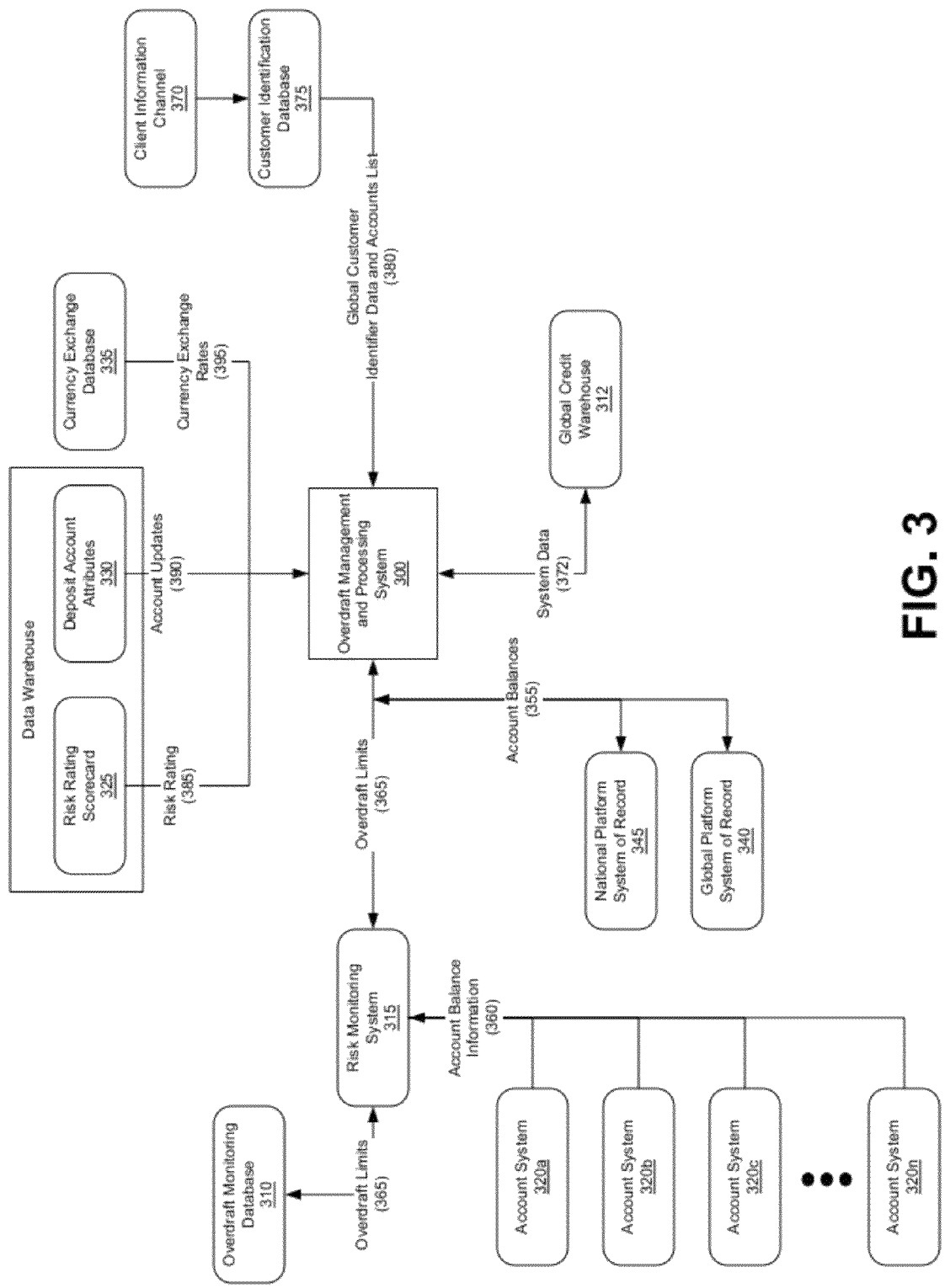
FIG. 3 is a block diagram of an example management and processing system with data flows between various components in communication with the system according to one or more aspects described herein.

FIG. 3 is an example schematic diagram illustrating an example management and processing system including various data flows between various components in communication with the system. As shown, provided is a management and processing system 300 that may communicate with numerous different components, systems, databases, platforms, and the like, some or all of which may or may not be operated by the same organization that operates and maintains management and processing system 300. For example, in at least one arrangement, management and processing system 300 may communicate with a customer identification database 375 that is also in communication with a client information channel 370, a global credit warehouse 312, risk monitoring system 315, national platform system of record 345 and global platform system of record 340.

As shown in FIG. 3, management and processing system 300 may exchange communications with customer identification database 375 that includes global customer identifier data and accounts list 380. Global credit warehouse 312 may be utilized by management and processing system 300 for system-related data 372, which may include credit-related information for clients of the organization. Both national platform system of record 345 and global platform system of record 340 may send account balance data 355 to management and processing system 300, and both systems of record (e.g., 345 and 340) may also receive back such data in, for example, an updated form from management and processing system 300. Risk monitoring system 315 may send and receive limits 365 data with monitoring database 310, and such overdraft limits 365 data may further be passed to and from risk monitoring system 315 and management and processing system 300. Various account systems 320a through 320n (where "n" is an arbitrary number) of the organization may transmit account balance information 360 to risk monitoring system 315, which may incorporate such account balance information into the limits 365 data sent to management and processing system 300.

In at least some arrangements, management and processing system 300 may also exchange information and data with components included within a data warehouse. Examples of such components included within a data warehouse may include a risk rating scorecard 325 and deposit account attributes 330. Management and processing system 300 may receive data related to risk rating 385 from risk rating scorecard 325 and receive account updates 390 from deposit account attributes 330. Additionally, in one or more arrangements, management and processing system 300 may receive currency exchange rates 395 data from a currency exchange database 335. Management and processing system 300 may also communicate with numerous other systems, databases, platforms, and the like through any of the various communication modes and channels described above and illustrated in FIGS. 1 and 2, in addition to or instead of the example components shown in FIG. 3.

Figure 4:
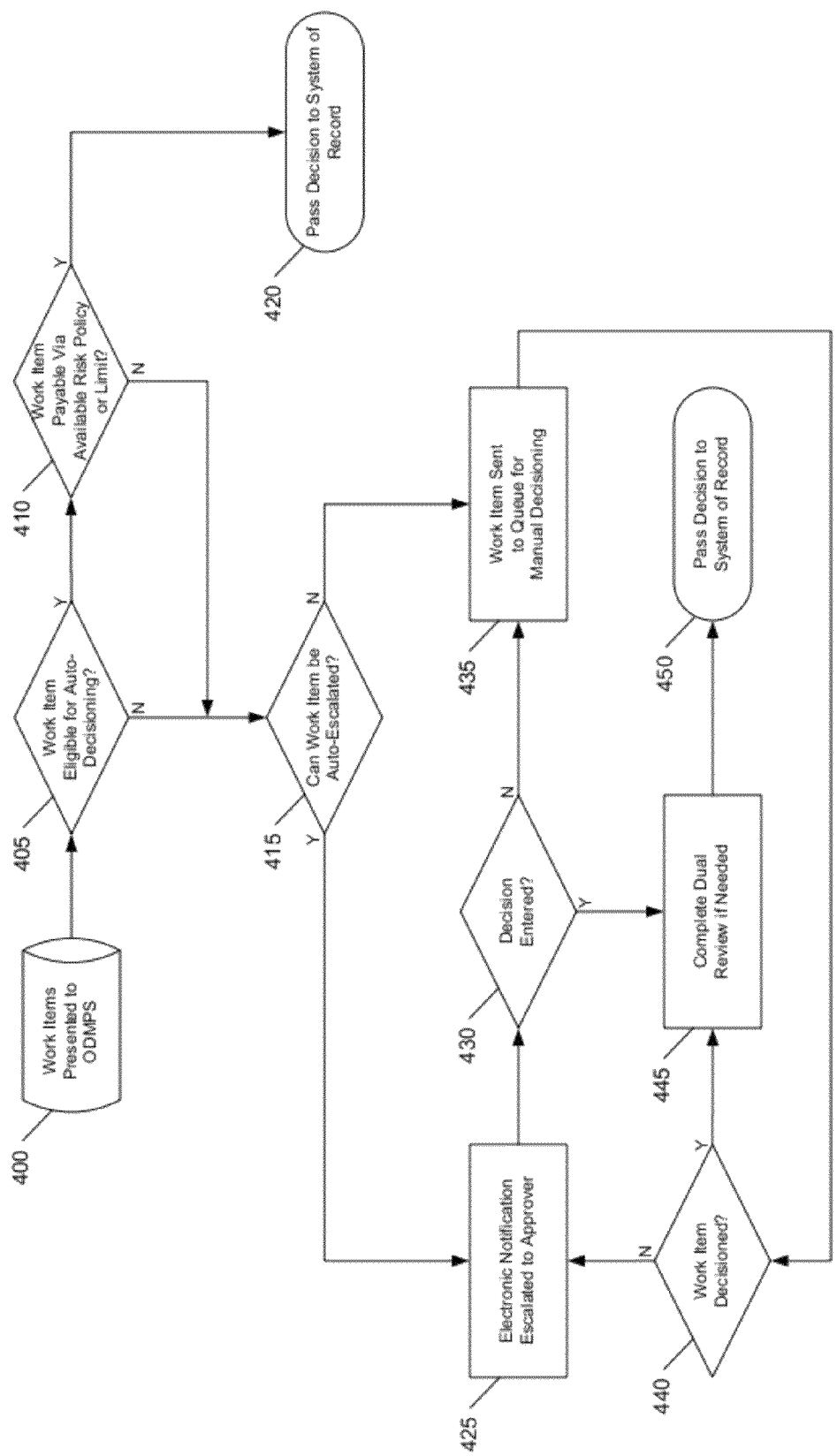
FIG. 4 is a flowchart illustrating an example high-level method of processing and decisioning exceptions to treasury limits according to one or more aspects described herein.

FIG. 4 is a flowchart illustrating a high-level process flow for decisioning transactions exceeding a line of credit using a management and processing system as described herein. The process beings in step 400 with the management and processing system (e.g., management and processing system 300 illustrated in FIG. 3) receiving requests for transaction decisions, referred to herein as "work items," from, for example, one or more account management systems. These work items are, for example, requests for decisions to be rendered on pending transactions exceeding a line of credit for client accounts of the organization. In one or more arrangements, these account management systems may include an organization's wire transfer systems, deposit account systems, and various automated processing systems associated with client accounts in different regions throughout the world. It is to be understood that the various labels and/or references used herein are for purposes of explaining the numerous aspects of the disclosure and are not intended to limit the scope of the disclosure in any way.

In step 405, a determination is made as to whether the work item is eligible for auto- decisioning based on one or more of a plurality of parameters that may be configured by the organization in numerous alternative ways to include/exclude work items from undergoing auto- decisioning processes. In at least one arrangement, the auto-decision eligibility determination made in step 405 may be based on one or more of the following parameters: transaction type (e.g., decisionable transaction, not bill payment, not ATM withdrawal, and the like), account/product type involved (e.g., not personal or consumer/retail), specialty assets group (SAG) flag set (e.g., flag indicator for clients deemed to be high-risk and reclassified for special handling outside of auto-decisioning), exception type or referral reason associated with the transaction, non-policy account at issue (e.g., account was manually identified in the system by a user), high risk indicator (e.g., manually set in the system by a user), family and/or primary GCI number, account number, hold placed on account, country of account, risk rating of account, branch, platform, number of days account exceeds a line of credit, existing balance amount on account, and other such related parameters. It is to be understood that the parameters mentioned above are only a few examples of many different parameters, characteristics, and other such attributes that may be alternatively or additionally be utilized by the system to render work items eligible and/or ineligible for auto-decisioning in step 405 of the process illustrated.

If in step 405 the work item is determined to be eligible for auto-decisioning based on any one or more of the parameters configured for use by the system, such as those described above, then the process moves to step 410 where the system determines whether the work item can be paid (e.g., fulfilled, satisfied, reconciled, and the like) based on one or more limits and/or risk policies relevant to the particular account involved or the related family of accounts in the account relationship. If it is determined that the work item cannot be paid by the available work limit or risk policy in step 410, then the process continues to step 415, which is further described below. If the work item is found to be capable of being paid by the available risk policy or limit, then in step 420 the decision is passed to the system of record for use with, for example, posting on a client accessible application.

If in step 405, a work item is determined to be ineligible for auto-decisioning based on any one or more of the parameters established by the organization and configured for use by the system, then the process proceeds to step 415 where it is determined whether the work item can be auto-escalated to an approver, such as an account manager, processing associate, or other authorized member of the organization. If it is found in step 415 that the work item can be auto-escalated, then in step 425 an electronic notification may be sent directly to the approver to notify him or her that a decision needs to be made on a pending transaction exceeding a line of credit for a particular account. In at least some arrangements, the electronic notification sent to the approver in step 425 may indicate to the approver that there are one or more special attributes or characteristics about the pending transaction and/or the client account related to the pending transaction.

If at step 415 it is instead found that the work item cannot be auto-escalated to an approver, then the process goes to step 435 where the work item is sent to a queue for manual decisioning by an approver once any other work items already in the queue are processed. Once the work item is placed in the manual queue in step 435, then in step 440 the system determines whether an approver has rendered a decision on the work item. There are a variety of factors that may be considered by the system in determining whether the work item has been decisioned in step 440. For example, an approver who has received the work item from the manual queue may unequivocally approve or deny the work item (e.g., approve or deny the pending transaction), may partially approve or deny the work item such that additional review by another approver or member of the organization is required, may determine that there is not enough information available for the underlying account to render a hard decision on the work item, or perform numerous other actions that will be interpreted by the system in different ways depending on how the system is configured. In one or more arrangements, only when a work item is unconditionally and unequivocally approved or denied is the work item determined to be decisioned in 440.

Once a work item is determined to be decisioned in step 440, then in step 445 dual review of the work item is completed if certain criteria set by the organization are met. Once any dual review of the work item is completed then the decision gets passed to the system of record (SOR) for use in, for example, posting to client or account application.

According to other aspects of the disclosure, the management and processing system may provide workflow and approval capabilities similar to the decisioning described above to enable the organization to manage, process/resolve and escalate aged transactions based on appropriate risk policy and within configurable business rules and limits. As used herein, an "aged transaction" is a recurring transaction exceeding a line of credit, meaning that it stands decisioned on day 1, is not yet funded, and is more than one day old. In some arrangements, aged transactions may be given different priorities, such as "approval required," "review," "low priority," "excluded," and/or other similar categorical label, and the system may provide for reporting/viewing information related to aged transcation processing (e.g., by client team, market, division, LOB, and the like).

In at least one arrangement, the management and processing system may be configured to automatically apply appropriate item charges/fees in accordance with auto-decisioning business rules and applicable government and agency regulations. For example, an organization may issue a charge/fee for book limit(BOD) transaction processing, in which case the system may be programmed or otherwise configured to automatically assess the charge/fee to an account whenever such a BOD transactions occurs. In some arrangements, the system may enable a user to apply or waive any fee/charge associated with a overdraft transaction within a GUI during manual decisioning of the transaction, as well as override any fees and/or charges for auto-decisioned items in accordance with various workflow rules. The functions and capabilities provided to users through the varios GUIs of the overdraft management and processing system will be described in greater detail below.

FIGS. 5-11 illustrate example graphical user interfaces (GUIs) that may be configured to standardize workflow of transactions exceeding a line of credit not resolved by or not subject to automated decisioning by the management and processing system. The GUIs are also configurable to provide users with the ability to review and report various data and information associated with processed (e.g., approved, declined, suspended, and the like) transactions. As will be described in greater detail below, the example GUIs illustrated in FIGS. 5-11 enable users to review transactions decisioned by auto-processes and, in one or more arrangements, override such decisions if necessary. The GUIs further allow users to decision, review and track status of non-auto-decisioned transactions. Such non-auto-decisioned transactions may be alternatively be referred to as manually-decisioned transactions or manually-processed payment balance exceptions.

The management and processing system may generate the GUIs shown in FIGS. 5-11 to ensure consistent application of workflow driven manual criteria across all platforms of the organization. Additionally, the system may provide consolidated client views and reports of all relevant data and information within the GUIs (e.g., leverage client information business resources and risk rating information for routing approvals, historical client information, aggregated view of client accounts/account balances within certain relationship structures). In some arrangements users are given the ability to manage queues of transactions, prioritize and distribute undecisioned transactions or items requiring dual or escalated review, track status of transactions undergoing decisioning and numerous other capabilities similar to those mentioned. As will be described in greater detail below, the GUIs illustrated in FIGS. 5-11 may be configured to allow users to sort data presented, submit additional data, edit existing data, generate reports based on data presented, setup and/or send notifications, as well as perform additional functions that may be determined by the organization to which a given user belongs.

According to other aspects of the disclosure, the management and processing system described herein may create and utilize the GUIs shown in FIGS. 5-11 to implement a rules-based escalation workflow that identifies and facilitates routing of transactions exceeding a line of credit to appropriate approval authority with an organization for decisioning and status tracking with minimal handoffs to intermediary and/or intervening parties. For example, the system may leverage information for an appropriate transaction approver and client team from one or more platforms or information channels operated or monitored by the organization (e.g., client information channel 370 and/or global platform 340 shown in FIG. 4).

Figure 5:
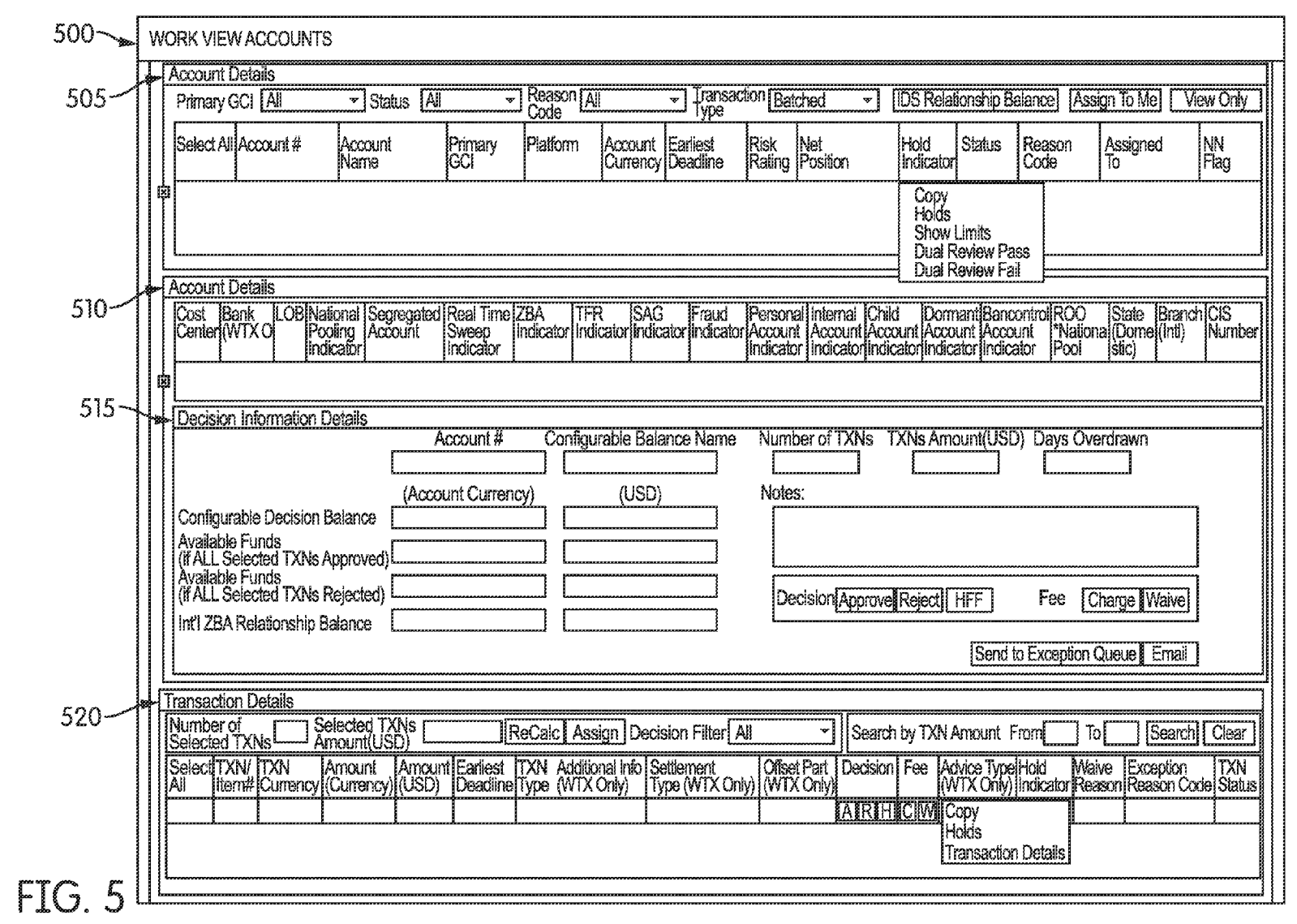

FIG. 5 is an example user interface for viewing detailed account information about all exceptions to treasury limits and account balances associated with a particular client relationship. As shown in FIG. 5, a "Work View Accounts" GUI 500 displays to a user various items of information relevant to a given client relationship, including information presented in Account Information section 505, Account Details section 510, Decision Information Details section 515 and Transaction Details section 520. In one or more arrangements users may enter identifiers for a particular client or account and have relevant information presented to them in any of the example data fields contained in the section blocks described above. Additionally, in the Decision Information Details section 515 users may perform one or actions on accounts that are currently being viewed in GUI 500. For example, as shown in the Decision Information Details section 515, an authorized user may decision (e.g., approve, reject, and the like) a particular transaction that is pending before the organization and also forward such decisioning to a transaction queue (e.g., "Exceptions Queue") for further processing. Numerous other details, views and/or configurable actions related to transactions exceeding a line of credit and client accounts may also be built into GUI 500 in addition to or instead of those illustrated in FIG. 5.

Figure 6:
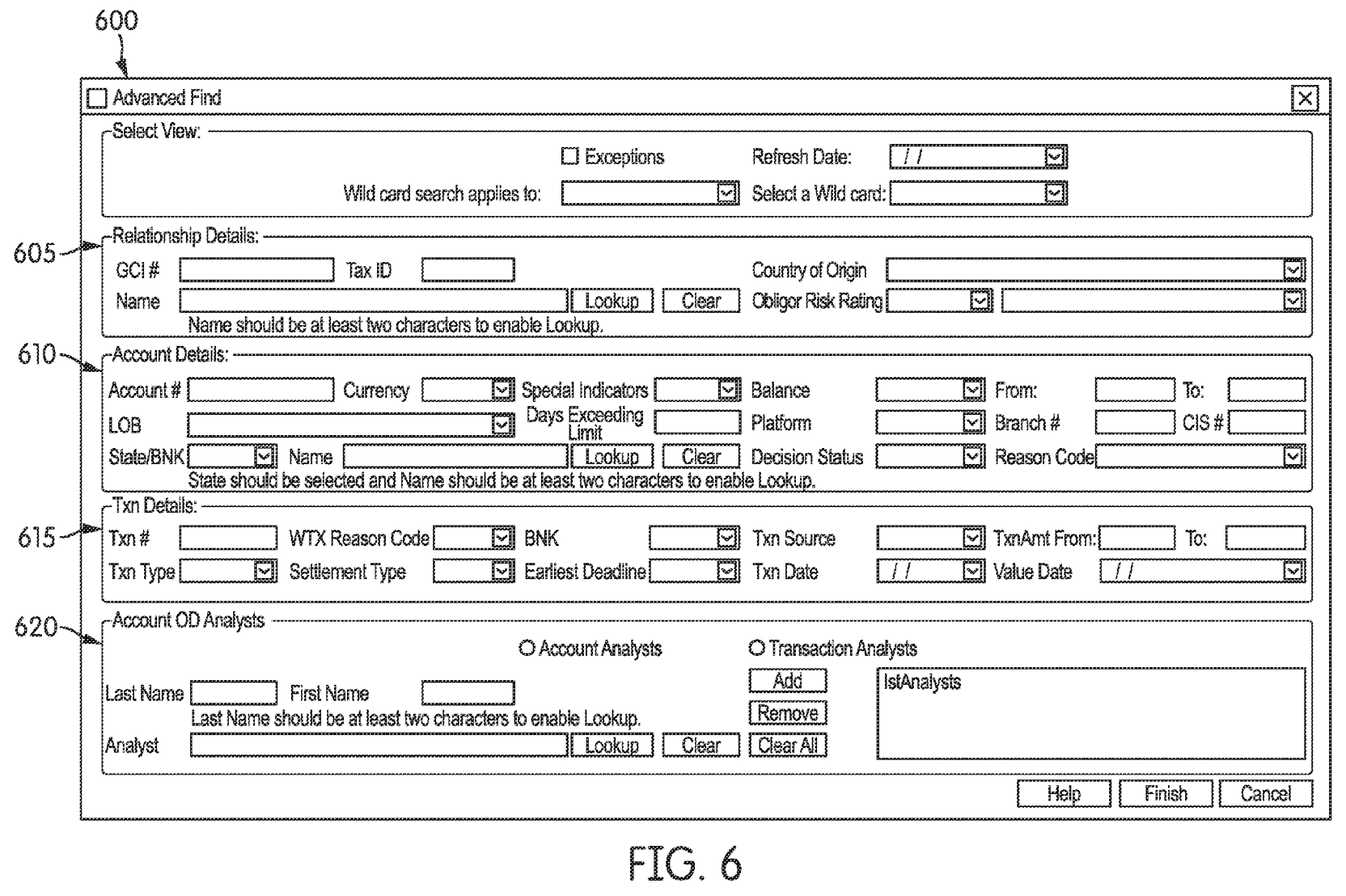

FIG. 6 illustrates an example Advanced Find GUI 600 in which a user may search for a given transaction based on a variety of selectable criteria. As shown, a user may search for a transaction by entering various relationship details 605, account details 601 and also transaction detail 615. Additionally, a user may enter details related to an account analysis 620 being performed by or assigned to a given analyst of the organization by adding/removing certain items of information related to the account involved.

FIG. 7 shows an example Account Holds GUI 700 that allows users to place/remove holds on clients' accounts in order to, for example, force manual decisioning on transactions related to certain clients determined by the organization to be "higher risk" clients. As shown, by entering a GCI number 705 or account number 710 into GUI 700, a user can select to place or remove holds at either the account level 720 or transaction level 725 for the identified client accounts.

FIG. 8 is an example user interface that displays relationships between multiple accounts requiring exception decisioning and allows a user to view the status of each decision. In one or more arrangements, the management system may forward all processing transactions as "work items" to a master work flow queue, a portion of which is illustrated in FIG. 8 as queue 800. Queue 800 may be particular to one user of the management system or may be similarly displayed for multiple users of the system, such as a team of members of the organization collectively working on accounts associated with a single client. As shown in FIG. 8, queue 800 may present summary level information about a family of related clients and/or accounts such that various relationship details may be identified in the context of exception decisioning.

As shown in the example user interface of FIG. 8, queue 800 may present information grouped at the highest level by Ultimate Parent Global Customer Identifier (GCI) # 805. As used herein, GCI refers to a client identification number that is used by an organization to link together a client's use of all products and services of the organization. The GCI may be used, for example, to provide consistent identification and aggregation of clients, agents of clients and various account-related officers across the entire organization. Accordingly, the Ultimate Parent GCI # 805 cell displays a unique number associated with a particular parent client of the organization, such as "1111111111" for ultimate parent client "XYZ Corp" shown in the GCI Name 810 cell of queue 800. A user may expand/collapse the various rows of queue 800 such that information may be viewed about any clients related to a given ultimate parent client. In the example illustrated in FIG. 8, XYZ Corp may have several subsidiary companies, such as "XYZ East," "XYZ West," "XYZ Corp 1" and "XYZ Corp 5," each of which is identified by a different GCI number displayed in the Primary GCI # 830 cell of queue 800. In one or more arrangements, queue 800 may be expanded to a level that displays information about each account associated with the primary or subsidiary companies of a parent client and allows a user to view relationship and status information about accounts that presently require exception decisioning. The information displayed in queue 800 may include account numbers 835, account names 840, number of exception accounts 815 for the family of clients, a status 855 of each such exception account, number of transactions 845 for the family along with transaction amounts 850 (e.g., in U.S. dollars), risk ratings 820 for the family of clients, associated lines of business (LOB) 825, approvers (e.g., associates, employees, members, approvers, officials, agents, and the like) of the organization to which each exception decision is assigned to 860, and also a reason code 865 that may be used for purposes of determining at least a general category of reasoning underlying a decisioned or undecisioned account.

Figure 9:
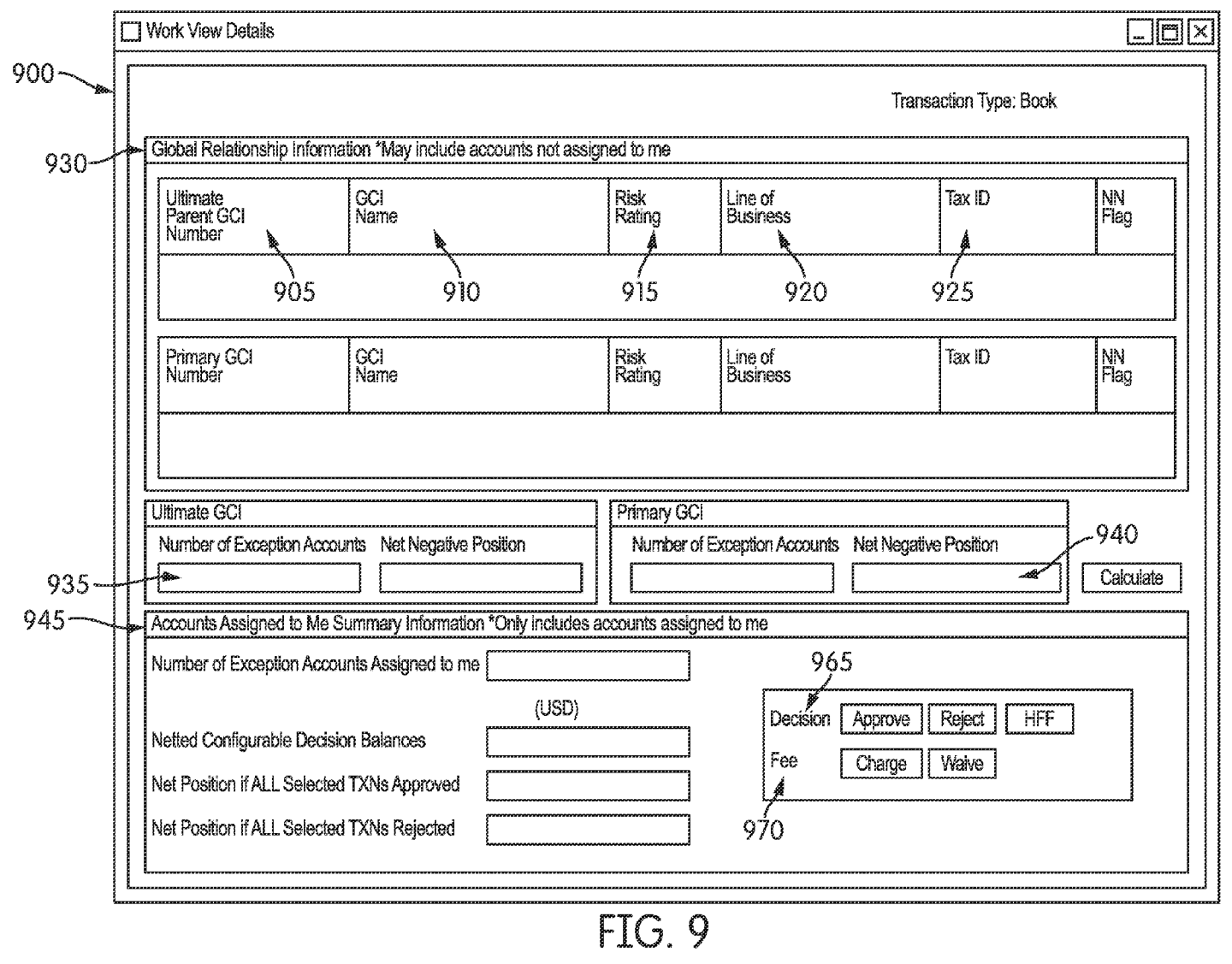

FIG. 9 is an example user interface for viewing detailed account information about all exceptions to treasury limits and account balances associated with a particular client relationship. As shown, a Work View Details GUI 900 may contain a global relationship information section 930 that allows a user to view information such as GCI number 905 for a parent client, as well as a primary or other related subsidiary client, GCI name 910, a risk rating 915 calculated for the client, line of business 920 associated with the client or account, a tax identification number 925 and additional items of information related to any of the other data fields shown in the global relationship information section 930 of GUI 900. There may also be provided calculation sections 935 and 940 in which a user may enter various information for a parent or primary client, such as the number of exception accounts (e.g., related accounts of the client that have access to an transaction limit or treasury limit), and have displayed in GUI 900 a net negative position calculated for the client based on the entered information.

Additionally, GUI 900 may have an "Accounts Assigned to Me Summary Information Section" 945, or a section similarly titled in alternative ways that allows a user to view various items of information about exception accounts that have been assigned to the user for decisioning/processing by the system. As shown, GUI 900 may provide a user with the ability to render a decision 965 on a particular pending transaction that has been assigned to the user for manual decisioning, and also provide the user with the ability to charge/waive a related fee 970. It is to be understood that numerous other capabilities and functions related to decisioning and viewing transactions/exceptions may also be built into GUI 900 in addition to or instead of those described above and illustrated in FIG. 9.

Figure 10:
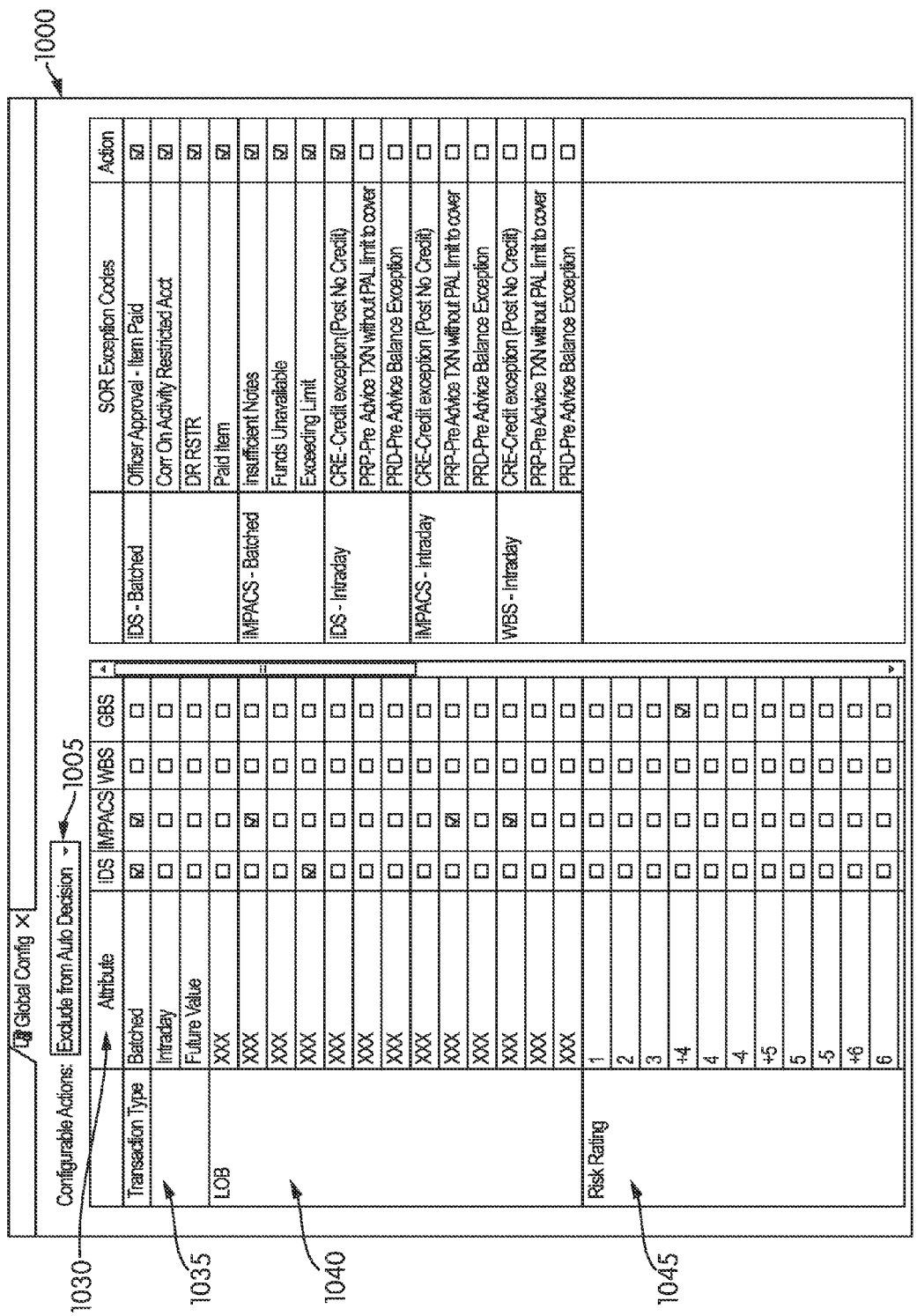
FIG. 10 illustrates an example user interface for configuring straight-through processing of exceptions to treasury limits for a management and processing system according to one or more aspects described herein.

FIG. 10 is an example user interface for configuring various actions of the management and processing system for straight through processing, workflow, and risk. As shown, a Global Configuration GUI 1000 may be provided to enable a user to select various attributes 1030 for inclusion and/or exclusion when the system performs any of a host of configurable actions 1005 including auto-decisioning, auto-escalation, identifying approvers, determining if dual review is required, and any of the other numerous actions shown, for example, in FIGS. 5-7. In the example GUI 1000 shown in FIG. 10, a user can choose to have the system assess a particular work item presented to it for auto-decision based on attributes related to transaction type 1035, line of business (LOB) 1040 and risk rating 1045. Various other categories of attributes may also be included for configuring actions of the system in addition to or instead of those shown in FIG. 10 and described above.

Figure 11:
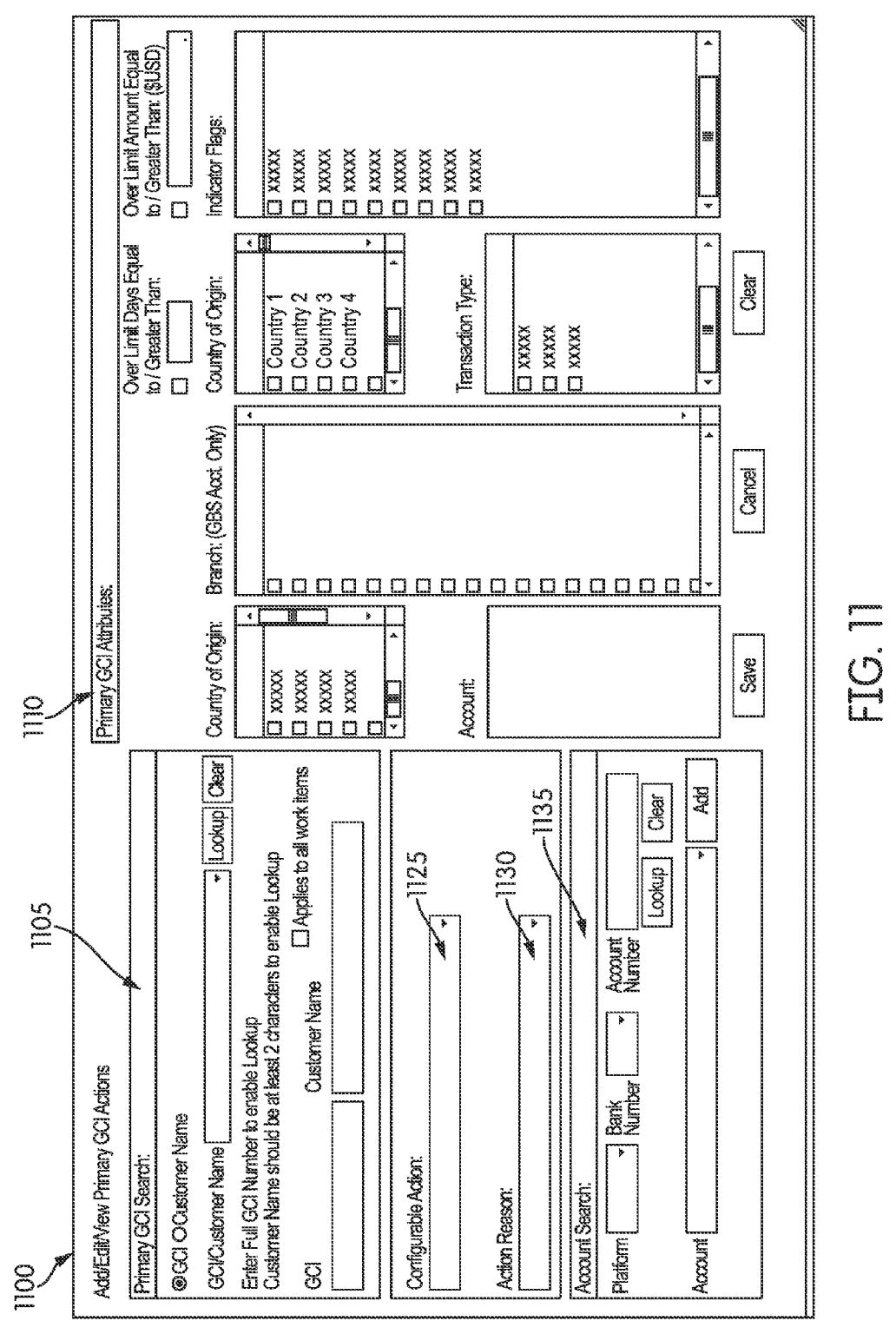

FIG. 11 shows an example Add/Edit/View GCI Actions GUI 1100, which in one or more arrangements is a user interface that allows a user to conduct a client search 1105 based on GCI number or client name and taking into account certain selected client attributes 1110. Additionally, GUI 1100 may allow a user to select among configurable actions 1125 to take along with reasons for taking such actions 1130. In some arrangements, GUI 1100 may also allow a user to directly conduct a search for a particular account 1135 by entering such information as platform, account number, and the like.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A method comprising:

receiving, at a server, transaction decision requests from a plurality of account management systems of an organization, wherein the transaction decision requests correspond with pending transactions for accounts of the organization;

determining, by the server, whether a pending transaction for an account can be fulfilled within one or more limits recorded for the account;

responsive to determining that the pending transaction can be fulfilled within the one or more limits, the server transmitting transaction decision to a corresponding account management system of the plurality of account management systems;

responsive to determining that the pending transaction cannot be fulfilled within the one or more limits, the server transmitting the corresponding transaction decision request to transaction approver of the organization;

determining, by the server, whether the pending transaction meets one or more criteria for automated-decisioning by the sever;

responsive to determining that the pending transaction meets the one or more criteria, the server retrieving the one or more limits recorded for the account from a centralized limits database of the organization;

determining, by the server, whether attributes of the pending transaction are within the one or more limits retrieved from the central limits database; and responsive to determining that the pending transaction does not meet the one or more criteria for automated-decisioning by the sever, the server transmitting the corresponding transaction decision request to the transaction approver of the organization, which includes:

determining, by the server, whether the pending transaction meets one or more criteria for expedited review by a transaction approver of the organization;

responsive to determining that the pending transaction does meet the one or more criteria for expedited review, the server transmitting a notification of the corresponding transaction decision request to the transaction approver; and responsive to determining that the pending transaction does not meet the one or more criteria for expedited review, the server transmitting the corresponding transaction decision request to a manual processing queue, wherein the manual processing queue includes one or more additional transaction decision requests.

2. The method of claim 1, further comprising:
receiving, at the server, a transaction decision for the pending transaction from the transaction approver of the organization; and
transmitting, by the server, the received transaction decision to the corresponding account management system of the plurality of account management systems.

3. The method of claim 2, further comprising:
prior to the server transmitting the received transaction decision to the corresponding account management system, the server determining whether review of the transaction decision is required based on one or more attributes of the account associated with the pending transaction; and
responsive to the server determining that review of the transaction decision is required, the server transmitting the transaction decision to a different transaction approver of the organization.

4. The method of claim 1, wherein the one or more limits recorded for the account are recorded in a centralized limits database of the organization.

5. The method of claim 4, wherein the one or more limits recorded for the account include one or more risk policies established by the organization and maintained in the centralized limits database of the organization.

6. One or more non-transitory and tangible computer-readable media storing computer-readable instructions that, when executed by at least one computer, further cause the at least one computer to perform a method comprising:
receiving transaction decision requests from a plurality of account management systems of an organization, wherein the transaction decision requests correspond with pending transactions for accounts of the organization;
determining whether a pending transaction for an account can be fulfilled within one or more limits recorded for the account;
responsive to determining that the pending transaction can be fulfilled within the one or more limits, transmitting a transaction decision to a corresponding account management system of the plurality of account management systems;
responsive to determining that the pending transaction cannot be fulfilled within the one or more limits, transmitting the corresponding transaction decision request to a transaction approver of the organization;
determining whether the pending transaction meets one or more criteria for automated-decisioning;
responsive to determining that the pending transaction meets the one or more criteria, retrieving the one or more limits recorded for the account from a centralized limits database of the organization;
determining whether attributes of the pending transaction are within the one or more limits retrieved from the central limits database; and
responsive to determining that the pending transaction does not meet the one or more criteria for automated-decisioning, transmitting the corresponding transaction decision request to the transaction approver of the organization, which includes:
determining whether the pending transaction meets one or more criteria for expedited review by a transaction approver of the organization;
responsive to determining that the pending transaction does meet the one or more criteria for expedited review, transmitting a notification of the corresponding transaction decision request to the transaction approver; and
responsive to determining that the pending transaction does not meet the one or more criteria for expedited review, transmitting the corresponding transaction decision request to a manual processing queue, wherein the manual processing queue includes one or more other transaction decision requests.

7. The one or more computer-readable media of claim 6, the computer-readable instructions that, when executed by at least one computer, further cause the at least one computer to perform:
receiving a transaction decision for the pending transaction from the transaction approver of the organization; and
transmitting the received transaction decision to the corresponding account management system of the plurality of account management systems.

8. The one or more computer-readable media of claim 6, the computer-readable instructions that, when executed by at least one computer, further cause the at least one computer to perform:
prior to transmitting the received transaction decision to the corresponding account management system, determining whether review of the transaction decision is required based on one or more attributes of the account associated with the pending transaction; and
responsive to determining that review of the transaction decision is required, transmitting the transaction decision to a different transaction approver of the organization.

9. The one or more computer-readable media of claim 6, wherein the one or more limits recorded for the account are recorded in a centralized limits database of the organization.

10. The one or more computer-readable media of claim 9, wherein the one or more limits recorded for the account include one or more risk policies established by the organization and maintained in the centralized limits database of the organization.

11. An apparatus comprising:
a processor; and
a memory coupled to the processor, the memory storing computer-readable instructions that, when executed by the processor, cause the processor to perform:
receiving transaction decision requests from a plurality of account management systems of an organization, wherein the transaction decision requests correspond with pending transactions for accounts of the organization;
determining whether a pending transaction for an account can be fulfilled within one or more limits recorded for the account;
responsive to determining that the pending transaction can be fulfilled within the one or more limits, transmitting a transaction decision to a corresponding account management system of the plurality of account management systems;
responsive to determining that the pending transaction cannot be fulfilled within the one or more limits, transmitting the corresponding transaction decision request to a transaction approver of the organization;
determining whether the pending transaction meets one or more criteria for automated-decisioning;
responsive to determining that the pending transaction meets the one or more criteria, retrieving the one or more limits recorded for the account from a centralized limits database of the organization;

determining whether attributes of the pending transaction are within the one or more limits retrieved from the central limits database; and responsive to determining that the pending transaction does not meet the one or more criteria for automated-decisioning, transmitting the corresponding transaction decision request to the transaction approver of the organization, which includes:

determining whether the pending transaction meets one or more criteria for expedited review by a transaction approver of the organization;

responsive to determining that the pending transaction does meet the one or more criteria for expedited review, transmitting a notification of the corresponding transaction decision request to the transaction approver; and responsive to determining that the pending transaction does not meet the one or more criteria for expedited review, transmitting the corresponding transaction decision request to a manual processing queue, wherein the manual processing queue includes one or more other transaction decision requests.

12. The apparatus of claim 11, the memory storing computer-readable instructions that, when executed by the processor, further cause the processor to perform:
receiving a transaction decision for the pending transaction from the transaction approver of the organization; and
transmitting the received transaction decision to the corresponding account management system of the plurality of account management systems.

13. The apparatus of claim 11, the memory storing computer-readable instructions that, when executed by the processor, further cause the processor to perform:
prior to transmitting the received transaction decision to the corresponding account management system, determining whether review of the transaction decision is required based on one or more attributes of the account associated with the pending transaction; and
responsive to determining that review of the transaction decision is required, transmitting the transaction decision to a different transaction approver of the organization.

14. The apparatus of claim 11, wherein the one or more limits recorded for the account are recorded in a centralized limits database of the organization.

* * * * *